United States Patent [19]

Endo et al.

[11] Patent Number: 4,875,641
[45] Date of Patent: Oct. 24, 1989

[54] SCREW FOR INSEPARABLY JOINING CASSETTE MEMBERS

[75] Inventors: Katsuo Endo; Masahiro Makino, both of Miyagi, Japan

[73] Assignee: Sony Corporation, Tokyo, Japan

[21] Appl. No.: 179,310

[22] Filed: Apr. 8, 1988

[30] Foreign Application Priority Data

Apr. 11, 1987 [JP] Japan .................... 62-055249[U]

[51] Int. Cl.⁴ .................... G11B 23/04; F16B 25/00; F16B 39/30
[52] U.S. Cl. .................................. 242/199; 411/412; 411/413; 411/510
[58] Field of Search ............. 242/198, 199; 360/132; 411/508–510, 339, 338, 412, 413, 918, 166, 176, 908, 910

[56] References Cited

U.S. PATENT DOCUMENTS

| | | | |
|---|---|---|---|
| 2,121,193 | 6/1938 | Hanicke | 411/413 X |
| 4,258,607 | 3/1981 | McKewan | 411/413 X |
| 4,363,456 | 12/1982 | Goto | 242/199 X |
| 4,572,461 | 2/1986 | Horikawa et al. | 242/198 |

FOREIGN PATENT DOCUMENTS

| | | |
|---|---|---|
| 891807 | 9/1959 | United Kingdom . |
| 897190 | 9/1959 | United Kingdom . |
| 1278278 | 10/1969 | United Kingdom . |
| 1323032 | 4/1971 | United Kingdom . |
| 1555035 | 11/1976 | United Kingdom . |
| 2112683 | 9/1982 | United Kingdom . |

Primary Examiner—Donald Watkins
Attorney, Agent, or Firm—Lewis H. Eslinger; Jay H. Maioli

[57] ABSTRACT

A screw including a head and a shaft having a helically threaded portion and a barbed portion is provided. In operating the barbed portion driven into a hole by pressure on the head in the axial direction. When the barbed portion is completely driven into the hole, the threaded portion comes into contact with the wall of the hole for driving the screw slightly further into the hole in this manner tight engagement between the two members fastened by the screw can be achieved. The barbed portion is so formed as to prevent removal of the screw.

21 Claims, 5 Drawing Sheets

SCREW FOR INSEPARABLY JOINING CASSETTE MEMBERS

BACKGROUND OF THE INVENTION

The present invention relates generally to a screw. More specifically, the invention relates to a screw which does not come out once it is inserted into a hole provided in a pair of members to fasten them, and method for using the screw.

Such a screw may be used, for example, in an assembly requiring a nondisassembleable casing. One such example is a magnetic rental tape cassette on which a video image and sound are pre-recorded. It is necessary that the casing for the tape cannot be easily disassembled once it is assembled. The reason being that if the cassette tape casing is broken apart and the pre-recorded magnetic tape provided therein is removed, this original tape can be easily copied onto blank tapes in large quantities in a short time with a dubbing device. As a result of this dubbing, the copyright on the original tape is infringed and the copyright holder is deprived of royalties.

Consequently, a special cassette casing for the pre-recorded magnetic tape which cannot be easily disassembled without damaging, the casing has been proposed. The manufacturing cost of this type of casing, however, is high. It has, therefore, been an object in the prior art to provide a fastener which can be used to fasten the two halves of a conventional cassette casing in such a manner that they cannot be separated without damage to the casing.

Japanese Utility Model First Publications (Gikkaisyo) Nos. 59-82383, 59-144213, and 59-144214 exemplify such an improved screw. The screw has a special recess formed on its head. The recess can be engaged by a tool such as a screwdriver when tightening the screw. However, upon attempting to remove the screw, the screwdriver cannot properly engage the surfaces defining the recess of the screw and thus the screw cannot be drawn out.

Gikkaisyo No. 59-135577 discloses a screw which cannot be rotated without the use of a special tool.

The above screws have shafts on which normal threads are formed. The screw is inserted through a hole in one half of the casing and is tightened into a hole formed in the other casing half. This pair of casing members can, therefore, be easily separated from each other by removal of the screw.

Removal can be accomplished by gripping the head of the screw and rotating it. This grip on the head may be easily achieved by, for example, removing some of the casing material around the area where the head seats itself so as to allow insertion of pliers or the like.

In view of the above problem, a fastener has been proposed which, instead of threads, has a plurality of barb-like projections formed on a shaft. The projections engage the inner surface of a hole provided in a casing member and thereby prevent removal and disassembly. The fastener is driven through a through hole formed in one casing member into a bore formed in other member. Since it does not have a helical threads, the fastener cannot be removed from the bore by rotating the head thereof. It is, therefore, practically impossible to disassemble the casing once it is assembled.

If the above fastener is used alone, however, there is a problem in that it is impossible to fasten the two halves of the casing tightly. The reason being that, when the fastener is driven into the hole, the inner surface of the hole becomes slightly elastically deformed by the barbs in such a manner that when driving pressure against the head of the fastener is released, the elastic return force of the wall of the hole tends to drive the fastener slightly back in the direction from which it was inserted. As a result of this tendency for the fastener to be driven back, the fastener does not hold the members tightly and play between the two halves of the casing tends to occur.

SUMMARY OF THE INVENTION

It is accordingly an object of the present invention to provide an improved screw which can be tightened and which is impossible to remove without damaging the members which are being fastened once it is inserted.

It is another object of the invention to provide an improved inseparable fastening apparatus by means of a screw.

According to one aspect of the invention, a screw includes a helical threaded portion, an engaging portion provided with a plurality of barb-like projections, and a screw head. In joining a pair of members, the barbed section is inserted through a through hole formed in one member and driven into a bore formed in another member until the threaded portion can be screwed into the bore. Thereafter, the screw can be tightened in the conventional manner so that the pair of members are firmly connected to each other without any play and cannot be disassembled without damage.

According to another aspect of the invention, a screw for fastening a first and a second member comprises, a shaft, a barbed section, formed on the shaft, for establishing firm engagement of the shaft with the second member, the barbed section being functional for allowing axial movement of the shaft with respect to the second member in a first direction and restricting axial movement of the shaft in a second direction opposite to the first direction, and a helical threaded section, formed on another section of the shaft, for fastening the first and second members in cooperation with the barbed section.

According to another aspect of the invention, a screw for inseparably joining a casing including a first and a second section comprises, a shaft, a head integrally formed on an end of the shaft, a barbed portion formed on the shaft for tightly engaging the sections, the barbed section being active for allowing axial advance of the shaft with respect to the second section in a first direction and preventing axial movement of the shaft in a second direction opposite the first direction, and means, provided on another portion of the shaft, for at least partly engaging the second section so as to fasten the first and second sections in cooperation with the barbed section, when the bottom of the head reaches the first section.

According to another aspect of the invention, a fastening apparatus comprises, at least a first and a second member, the first member having a first hole and the second member having a second hole formed at such a position that the second hole is corresponding to the first hole, means for fastening the first and second members, the means including a shaft and a head formed on an end of the shaft, an engaging section provided on the shaft for unremovably engaging the second hole through the first hole so as to join the first and second members when the bottom of the head reaches to the outer surface of the second member, and a fastening section, positioned on the shaft adjacent to the engaging section, for tightly fastening the first and second members.

According to another aspect of the invention, a screw comprises, a head, a recess formed at a top surface of the head, a shaft integrally formed with the head, a screw thread formed on the peripheral surface of the upper end of the shaft, and barbed-like projections formed on a peripheral surface of the lower end of the shaft.

According to other aspect of the invention, a tape cassette using screws comprises, a case composed of an upper half and a lower half, a hole formed on the lower half, a concave area formed on the upper half, a screw having a thread and barbed-like projections, wherein the thread is formed on the upper portion of the shaft of the screw and the barbed-like projections are formed on the surface of a lower portion thereof, and the two halves are joined by the screw.

BRIEF DESCRIPTION OF THE DRAWINGS

The present invention will be understood from the detailed description given hereinbelow and from the accompanying drawings of the preferred embodiment of the invention, which, however, should not be taken to limit the invention to the specific embodiment but are for explanation and understanding only.

DESCRIPTION OF THE PREFERRED EMBODIMENT

Figure 1:
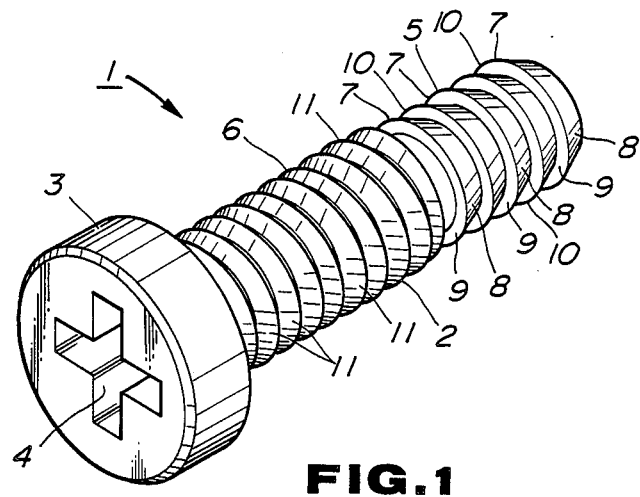
FIG. 1 is a perspective view of the preferred embodiment of a screw in accordance with the present invention.
Figure 2:
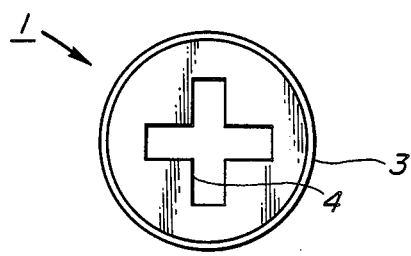
FIG. 2 is a side view of the screw.
Figure 3:
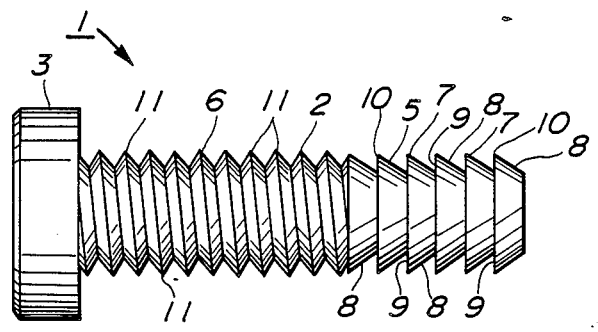
FIG. 3 is a front view of the screw.
Figure 4:
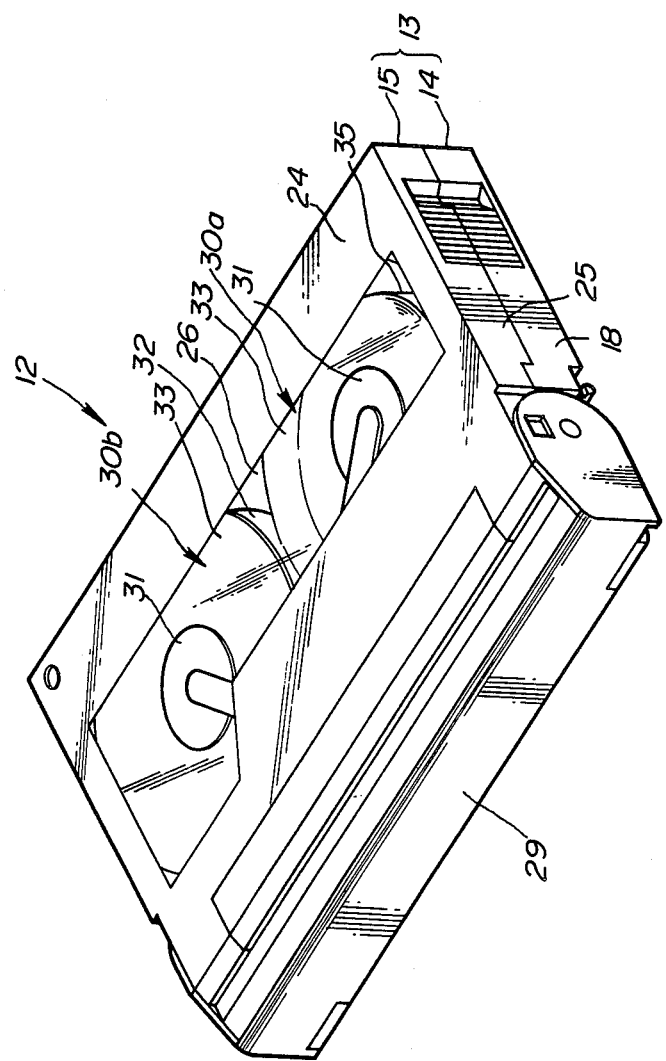
FIG. 4 is a perspective view of a magnetic cassette casing assembled by using the screw.
Figure 5:
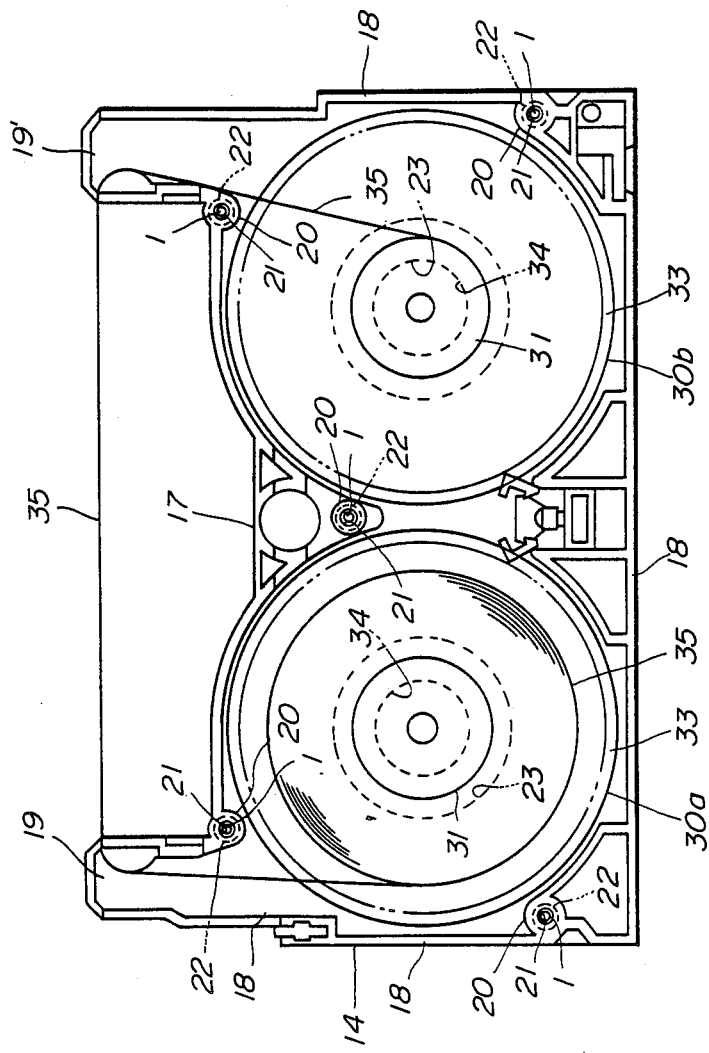
FIG. 5 is a plan view of the casing with an upper section removed.
Figure 6:
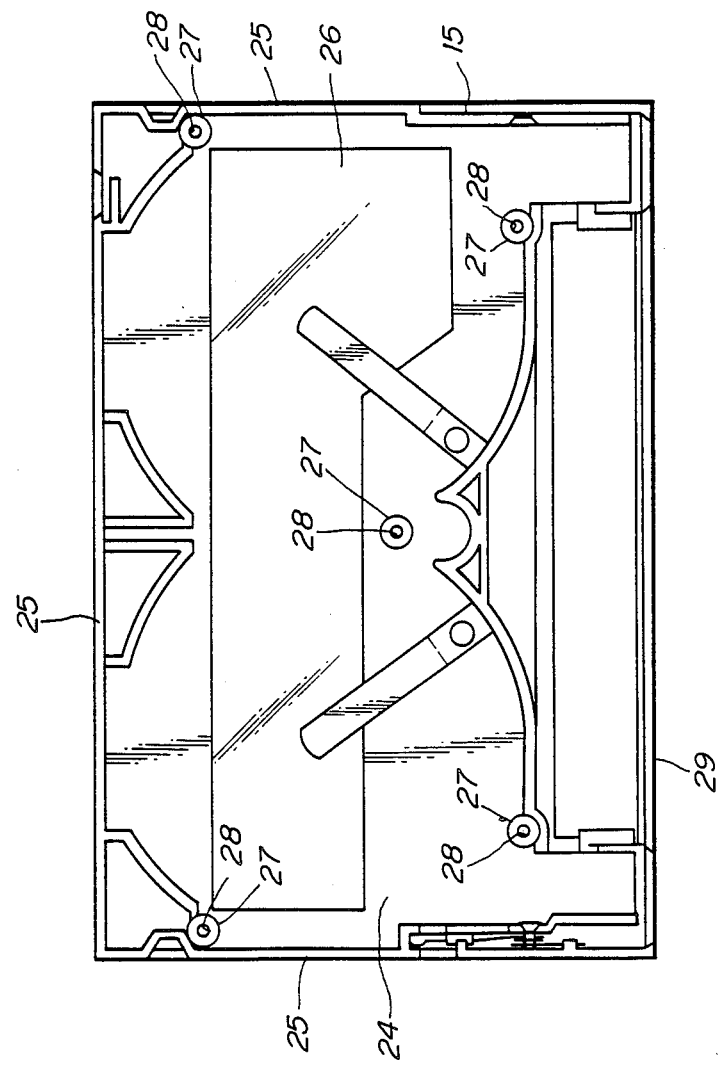
FIG. 6 is a bottom plan view of the upper section.

Referring now to the drawings, particularly to FIGS. 1 to 3 and 7, a screw 1 comprises a shaft 2 and a screw head 3 integrally formed on an end of the shaft 2. A cross shaped recess 4 for receiving a tool such as a Philips type screwdriver is formed in the upper surface of the head 3. The shaft has a helical threaded section 6 covering about three-fifths of its length and a barbed section 5 spanning the other two-fifths.

The barbed section 5 has a plurality of frusto-conical projections 7. Each of the projections 7 includes a surface 8 tapered in the opposite direction from the head 3 and a flat circular surface 9 which is perpendicular to the axis of the shaft 2. A sharp circular edge 10 is defined where the tapered surface 8 and the flat surface 9 meet. The outer diameter of the threaded section 6 is essentially equal to that of the barbed section 5.

A magnetic tape cassette and method of its assembly will be described hereinbelow.

Referring to FIGS. 4 to 7, a magnetic tape cassette 12 generally comprises a casing 13 including an upper section 15 and a lower section 14. A bottom plate 16 of the lower section 14 has a generally rectangular cut-out portion 17 at either end of which are tape guide columns 19 and 19'. Exterior surfaces of the columns 19 and 19' are recessed relative to side walls 18 of the lower section 14. During recording or reproduction, a section of a magnetic tape 35 stretched between the columns 19 and 19', is drawn out by a tape handling system of a player (not shown) at cut-out portion 17.

Figure 7:
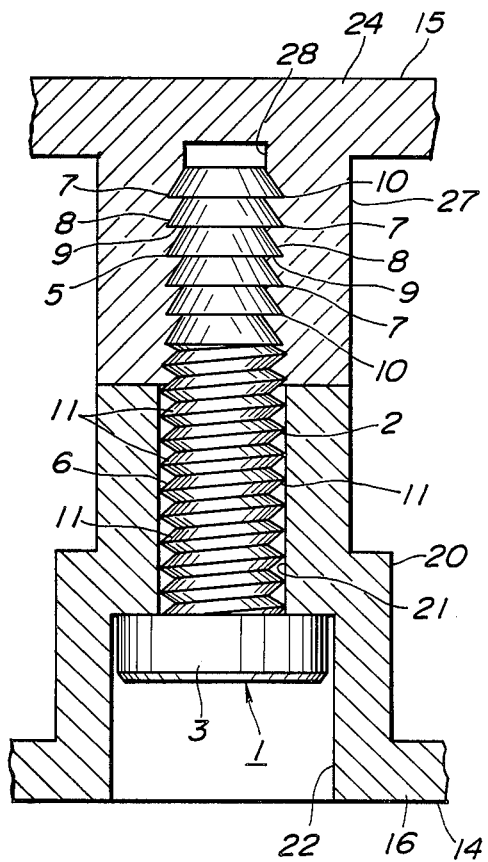
FIG. 7 is a cross-sectional view which shows the screw tightened into the cassette casing.

Bosses 20 are formed at predetermined positions on the bottom plate 16. Each of the bosses 20, as can be seen in FIG. 7, has a through hole 21 and a counter bore 22 coaxially formed therein. The diameter of the bore 22 is greater than that of the through hole 21. The diameter of the through hole 21 is slightly greater than that of the threaded section 6 of the screw 1. The diameter of the bore 22 is slightly greater than that of screw head 3. Apertures 23 having a greater diameter are positioned symmetrically with regard to the center of the bottom plate 16.

An upper plate 24 of the upper section 15 is a counter part to the plate 16 of the lower section 14 and has a wall 25 formed along its edge. The configuration of the wall 25 substantially corresponds to that of the wall 18 so that the edges of the walls 18 and 25 mate with each other when the sections 14 and 15 are assembled.

A window plate 26 is built into the upper plate 15. The plate 26 is made of a transparent resin and is integrally formed with the upper section 15 by multi-color molding. Bosses 27 are integrally formed on the upper plate 24 and arranged at positions corresponding to those of the bosses 20. The bosses 27 have bores 28, whose openings are inwardly directed. The inner diameter of the bores 28 is slightly smaller than the outer diameter of the threaded section 6 and barbed section 5 of the screw 1.

A pivotal closure lid 29 is installed in the casing 13 to cover the tape 35. The lid 29 is pivotably supported by the casing 13 so that the front of the cut-out portion 17 may be closed or opened to expose the tape 35. The lid 29 is biased to cover the tape 35. When the magnetic tape cassette 12 is loaded into a player, the lid 29 is opened against the biasing force by a lid-opening member (not shown) provided in the player. The tape handling system draws some of the tape 35 out of the casing 13 to load it onto a rotary drum (not shown) for recording or reproducing. Thereafter, when the recording or reproducing is over and the tape cassette 12 is returned to the stand-by state, the lid 29 is returned to the normal position.

Both reels 30a and 30b have hubs 31, lower flanges 32, and upper flanges 33. These flanges are integrally formed on both ends thereof. The upper flange 33 is made of transparent material so that the user can easily see how much tape is on each of the reels through the window plate 26. The hub 31 has an engaging portion 34 facing downward for engaging a reel shaft (not shown) which rotates the reel when recording or reproducing. The reels 30a and 30b are rotatably arranged within the casing 13. The engaging holes 34 are exposed through apertures 23 provided in the bottom plate 16 of the casing 13.

The magnetic tape 35 is connected at either end to the hubs 31 of the reels 30a and 30b respectively and the tape is wound around the hubs 31. The arrangement of the magnetic tape 35 is such that the tape on the left reel 30a can be drawn out from the casing 13 across the left tape guide column 19, drawn into the casing across the right tape guide column 19', and then wound around the right reel 30b. When the tape cassette 12 is loaded into the player, the pivotal closure lid 29 is opened to allow the tape to be drawn out from the casing 13 and then loaded onto a drum having rotary magnetic heads for recording and/or reproducing. In the tape operation, when recording, reproducing, or high speed winding, the tape is withdrawn from the reel 30b and wound around the reel 30a. When rewinding or playing in reverse reproducing, the tape is withdrawn from the reel 30b and wound around the reel 30a.

Connecting the upper section and the lower section using the screw 1 will be described in detail hereinbelow.

The upper section 15 and the lower section 14 are put together with the opposing edges of the side walls mating. The screw 1 is inserted through the through hole 21 of the boss 20 provided in the lower section 14 until the tapered surface 8 of the frusto-conical projection 7 at the end of the barbed section 5 partly enters into the bore 28 and comes in contact with the inner edge thereof. Pressure is, then, applied to the head 3 of the screw 1 in the direction of the upper section 15 to drive the barbed section into the bore 28 which elastically deforms the wall of the bore 28.

When the barbed section 5 is completely inserted into the bore 28 and the top of the threaded portion 6 adjacent to the barbed section 5 slightly enters into the bore 28, the screw 1 is rotated in the tightening direction, thereby causing the threads 11 to engage the walls of the bore 28 and the screw 1 to be driven deeper into the hole 21 until the head 3 comes to the bottom of the counter bore 22. In order to fasten the upper and lower sections 15 and 14 of the casing 13 tightly, it is required that the length of the threaded section 6 is slightly greater than that of the through hole 21 so that at least one thread of the threaded section 6 can be partly engaged in the wall of the bore 28.

If the screw 1 is rotated in the loosening direction with a tool such as a screwdriver, the screw may not come out from the bore 28 at all due to the engagement between the edges 10 of the projections 7 and the wall of the bore 28. Further, even if the threaded section 6 comes out of the bore 28, the tight engagement between the plurality of the edges 10 and the wall of the bore 28 does not allow the screw 1 to be drawn out from the bore 28 any farther and further rotation of the screw 1 will have no effect.

Therefore, it should be noted that the casing 13 assembled as described above cannot be disassembled without being broken.

It will be apparent from the preceding description of the preferred embodiments of the invention that many modifications and variations can be effected by one skilled in the art without exceeding the scope of the invention. For example, while in the disclosed embodiments the barbed section 5 is formed on the shaft 2 at the opposite end of threaded section 6 from the head 3 on the shaft 2, it would also be possible to form the barbed section 5 on the head 3 end of the shaft or at the middle portion and form the treaded section 6 at another portion. In such cases, preferably, threads may be formed in the bore, the length and position of the barbed section is positioned so as to be completely inserted into the bore, and the diameter of the barbed section is slightly greater than that of the threaded section. In this embodiment, the screw is inserted through the through hole and then driven into the threaded bore while being rotated in the tightening direction. The barbed section is drawn into the bore by the thread of the screw cooperating with those of the bore.

It may, therefore, be appreciated by one skilled in the art that the length and positions of the barbed section 5 and the threaded section 6 on the shaft 2 can be selected to accord with the intended application.

What is claimed is:

1. A screw for fastening together a first member and a second member, comprising;
   a shaft;
   a head integrally formed on an end of said shaft;
   a barbed section formed distally to said head on a portion of said shaft and including a plurality of frusto-conical, barb-like protrusions having a sharp outer edge, each of said edges being independent and in non-continuous mutual relationship, so as to establish firm engagement of said shaft with said second member, said barbed section being further formed so as to allow axial movement of said shaft with respect to said second member in a first direction and to restrict axial movement of said shaft in a second direction opposite said first direction; and
   a helical threaded section formed on another portion of said shaft so as to fasten the first and second members in cooperation with said barbed section.

2. A screw as set forth in claim 1, wherein said helical threaded section is formed at such a position that said threaded section is at least partly insertable into said second member when said barbed section is completely inserted into said second member.

3. A screw as set forth in claim 1, wherein said head includes a recess formed at a side opposite from said shaft.

4. A screw as set forth in claim 1; wherein said first and second members have a first and a second hole, respectively, the second hole formed in said second member having a diameter smaller than that of said barbed section, and the first hole formed in said first member having a diameter greater than that of said barbed section.

5. A screw as set forth in claim 1, wherein said barbed section has an outside diameter which is generally equal to that of said helical threaded portion.

6. A screw as set forth in claim 4, wherein said barbed section has an outside diameter which is greater than that of said second hole.

7. A screw as set forth in claim 4, wherein said threaded portion has diameter which is smaller than that of said first hole.

8. A screw as set forth in claim 4, wherein said barbed section is shorter than the depth of said second hole.

9. A screw for inseparably joining first and second sections of a casing comprising:
   a shaft;
   a head integrally formed on an end of said shaft;
   a barbed section formed on a portion of said shaft and including a plurality of frusto-conical, barb-like protrusions each having a sharp outer edge and each of said edges being discrete and in non-continuous mutual relationship, so as to be tightly engageable with said second section of the casing to allow axial advance of said shaft with respect to said second section in a first direction and prevent axial movement of said shaft in a second direction opposite said first direction; and
   means, provided in another portion of said shaft, for at least partly engaging with the second section and fastening the first and second sections of the casing in cooperation with said barbed section, when a bottom of said head reaches said first section.

10. A screw as set forth in claim 9, wherein said casing is a cassette tape casing.

11. A screw as set forth in claim 10, wherein said cassette tape casing is provided with a pair of tape reels onto which magnetic tape is wound, a transparent window formed in one surface of said cassette casing so as to show the interior of said cassette casing, a lid pivotably supported by said casing to expose said tape, a first boss provided at a predetermined position on said first section in which a through hole for receiving said engaging means is formed, a second boss provided on said second section at a position corresponding to said position of first boss, and a hole for engaging said barbed portion and a part of said engaging means formed in said second boss.

12. A screw as set forth in claim 9, wherein each of said plurality of protrusions includes a surface tapered in a direction opposite from said head, a flat surface positioned perpendicular to the major axis of said shaft, and said sharp edge is formed where said tapered surface and said flat surface meet.

13. A screw as set forth in claim 9, wherein said first section has a first hole with a diameter greater than that of said barbed portion, said diameter being given so as to allow insertion of said engaging means.

14. A screw as set forth in claim 9, wherein said second section has a second hole with a diameter and a predetermined length so as to allow said barbed portion to tightly engage the wall of said first hole.

15. A screw as set forth in claim 9, wherein said engaging means includes at least one thread.

16. A fastening apparatus comprising:
   at least a first member and a second member, said first member having a first hole, said second member having a second hole formed at such a position that said second hole corresponds with said first hole;
   means for fastening together said first and second members, said fastening means including a shaft and a head formed on an end of said shaft;
   an engaging section provided on said shaft for unremovably engaging said second hole through the first hole so as to join the first and second members, when the bottom of said head reaches the outer surface of said first member, said engaging section including a plurality of frusto-conical barb-like protrusions each having a sharp outer edge, each of said edges being independent and in non-continuous mutual relationship; and
   a fastening section positioned on said shaft adjacent said engaging section and formed so as to tightly fasten said first and second members together.

17. A fastening apparatus as set forth in claim 16, wherein said fastening section has at least one thread provided so as to engage with the wall of said second hole so as to eliminate any play between said first member and said second member.

18. A screw comprising:
   a head;
   a recess formed in a top surface of said head;
   a shaft integrally formed with a side of said head opposite said top surface;
   a screw thread forming on a peripheral surface of an upper end of said shaft; and
   barbed-like projections formed on a peripheral surface of a lower end of said shaft and including a plurality of frusto-conical, barbed-like projections having a sharp outer edge, each of said edges being independent and in non-continuous mutual relationship.

19. A screw as set forth in claim 18, wherein said barbed-like projections have upper sides formed in a plane at an approximately right angle to the major axis of said shaft, and lower sides inclined relative to said axis, said upper and lower sides meeting to form a respective sharp outer edge.

20. A tape cassette incorporating a screw, comprising:
   a case composed of an upper half and lower half said lower half having a hole formed therein, and said upper half having a concave area; and
   a screw having a shaft, a head integrally formed on an end of said shaft, a thread portion and a plurality of barbed-like projections, said barbed-like projections formed distally to said head on a portion of said shaft and each said projection being frusto-conical in shape having a sharp outer edge with each edge being independent and in non-spiral mutual relationship, said thread portion being formed on an upper end of the shaft of said screw proximal said head, and said plurality of barbed-like projections being formed on a lower portion thereof, said upper half and said lower half of said case being joined by said screw.

21. A tape cassette as set forth in claim 20, wherein said hole has a diameter that is larger than that external diameter of said screw, said concave area having a diameter that is smaller than the external diameter of said screw, and said hole being shorter than the length of the thread portion of said screw.

* * * * *